United States Patent [19]

Pitcairn et al.

[11] Patent Number: 4,624,402
[45] Date of Patent: Nov. 25, 1986

[54] METHOD FOR APPLYING AN OVERLAY WELD FOR PREVENTING AND CONTROLLING STRESS CORROSION CRACKING

[75] Inventors: David Pitcairn, Morgan Hill; Peter Riccardella, San Jose, both of Calif.

[73] Assignee: Nutech, Inc., San Jose, Calif.

[21] Appl. No.: 458,898

[22] Filed: Jan. 18, 1983

[51] Int. Cl.$^4$ .................. B23K 9/225; B23K 31/06
[52] U.S. Cl. .................................. 228/119; 228/222; 228/226
[58] Field of Search ............... 228/119, 225, 226, 222

[56] References Cited

U.S. PATENT DOCUMENTS 2,963,129 12/1960 Eberle .................................. 189/36
4,049,186 9/1977 Hanneman et al. ................ 228/225
4,348,041 9/1982 Imai et al. ...................... 228/225 X Primary Examiner—Kenneth J. Ramsey
Attorney, Agent, or Firm—Fliesler, Dubb, Meyer & Lovejoy

[57] ABSTRACT

Stress corrosion cracking 36 at a welded pipe joint 14 in service in a nuclear reactor can be controlled by the location of a overlay weld 18 over the primary weld 16, which extends axially along the pipe on either side of the primary weld 16. The overlay weld 18 is comprised of a plurality of circumferentially and continuously applied weld beads 35, 37 which extend substantially to a minimum distance necessary to produced a favorable residual stress pattern. This distance has been estimated to be the square root of the product of the radius of the pipe times the thickness of the pipe on either side of the primary weld 16.

8 Claims, 3 Drawing Figures 4,624,402

METHOD FOR APPLYING AN OVERLAY WELD FOR PREVENTING AND CONTROLLING STRESS CORROSION CRACKING

DESCRIPTION

Technical Field

The present invention relates to a welding technique for use in preventing and controlling stress corrosion cracking at a welded pipe joint and in particular, for use with welded pipe joints commonly employed in nuclear boiling water reactors.

BACKGROUND OF THE INVENTION

The problem of stress corrosion cracking in the heat affected zones of welds of stainless steel piping in nuclear reactors has long been recognized. This problem has been summarized in U.S. Pat. No. 4,049,186 which was issued on Sept. 20, 1977. This patent outlines a number of existing methods of solving this problem. Among the methods or "fixes" are solution annealing after welding to desensitize the heat affected zone, controlling the temperature of the inside surface or inside diameter of the pipe during welding, and using inlays of weld material before the welding. These methods cannot be applied to existing installed pipe joints without cutting into the pipe and interrupting the plant operation.

The above patent demonstrates a method for reducing stress corrosion cracking in a weld by applying an overlay weld. This overlay weld extends across the pipe joint and bridges on each side of the pipe joint beyond the actual extremity of the primary weld heat affected zone at the inner surface of the pipe. This method applies additional weld material above the weld joint to increase the pipe wall thickness at the weld joint, thereby reducing the applied stress. It was a well held theory when this patent issued that if the applied stress at the joint could be reduced below a certain level that this would inhibit stress corrosion cracking. The addition of welding material increased the cross-sectional area and as the applied stress is directly proportional to the applied load, and inversely proportional to the cross-sectional area, the stress is decreased.

In this reference the welding material was deposited over the pipe joint in two manners. The first manner included the formation of a ring extending about the circumference of the pipe and covering the primary weld. The ring was composed of a plurality of weld beads which were laid down axially along the pipe. Another method disclosed included the formation of a series of separate weld segment ribs extending axially along the pipe at the weld joint and spaced apart radially around the circumference of the pipe.

More recently, a new theory has been put forth as to the cause of stress corrosion cracking. This theory, as presently accepted, holds that residual tensile stresses are built up at the pipe joint when the initial weld is made and that these welding residual stresses play at least as significant a role as applied stresses in causing stress corrosion cracking when the pipe is in use.

Accordingly, it is believed that stress corrosion cracking can be reduced or eliminated by removing this residual tensile stress or by inducing a compressive stress. Initial findings in this area were reported in an Electric Power Research Institute publication, RP449-2 entitled "Residual Stress Measurements on Type 304 Stainless Steel Welded Pipes" and was presented on Jan. 22, 1980. One of the solutions presented in this paper included the ring overlay previously described in the above patent. It is believed that the other solution including the use of separate ribs induces even greater residual stresses and thus would not be appropriate for use with the new theory.

It has been found, however, that the overlay weld method of the above reference does not provide the most efficient and effective manner of solving the stress corrosion cracking problem. The present invention is directed to solving this problem in a more effective manner.

SUMMARY OF THE INVENTION

In the present invention, a weld overlay for a newly applied weld joint or for repairs to a crack or flaw in an installed pipe joint has been accomplished by circumferentially depositing weld beads. The deposition can be accomplished in layers, with each layer completed before the next layer is begun. The circumferential weld beads produce a restrictive force on the underlying pipe due to weld metal shrinkage. The accumulated effect of the weld beads comprised in the overlay produce compressive residual stresses under the overlay in both the axial and circumferential orientations on the pipe. The overlay extends well beyond the joint and any existing crack or flaw, and thus the propagation of the crack or flaw when the pipe is in operation will be mitigated by this changed residual stress pattern.

In one aspect of the invention, a method for controlling and preventing stress corrosion cracking in the heat affected zone on the inner diameter of a welded pipe joint comprises a step of applying to the outer diameter of the pipe an overlay weld including a plurality of circumferentially and continuously applied weld beads on the pipe joint and extending on each side of the pipe joint beyond the extremities of the heat affected zone.

In another aspect of the invention the method includes the step of applying the initial weld bead over the pipe joint and then applying a second weld bead adjacent the initial weld bead string and a third weld bead adjacent the second weld bead and so on axially and outwardly from each side of the pipe joint.

In still another aspect of the invention, the method includes a step of extending the weld beads axially on either side of the weld joint for a sufficient distance to ensure that the compressive residual stresses discussed above are prevalent over the entire susceptible zone of the original weld.

In yet another aspect of the invention, the method includes a step of applying at least one additional subsequent circumferential and continuous overlay weld on top of the first applied overlay weld.

DETAILED DESCRIPTION OF THE PREFERRED EMBODIMENT

Figure 1:
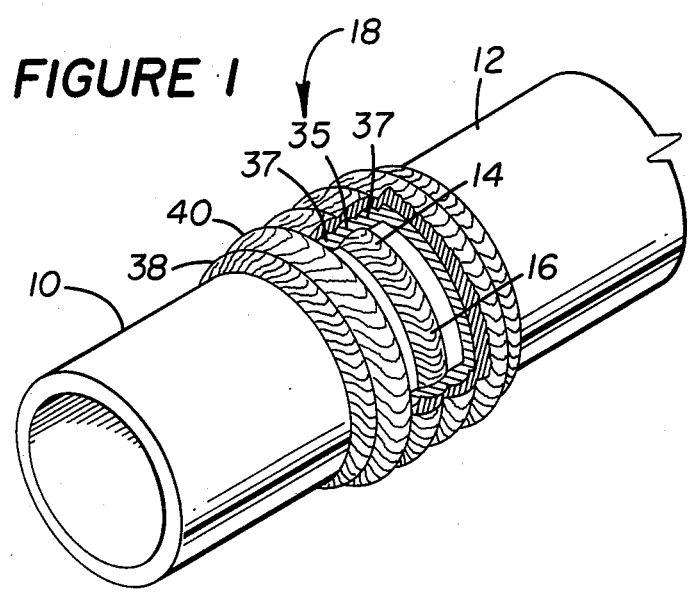
FIG. 1 depicts an overlay weld of the invention with a portion thereof cut away to reveal the primary pipe weld.

In reference to the figures, and in particular to FIG. 1, two pipe sections 10 and 12 are joined together at a butted pipe 14 by a primary weld 16. The overlay of the invention is denoted by the numeral 18 and is applied over the welded joint with a portion of the overlay weld 18 cut away to depict the welded joint 14. In this embodiment, the pipe sections are comprised of 304 stainless steel and the primary weld and the overlay weld are comprised of 308 L stainless steel. It is to be understood that other materials can be used as appropriate and fall within the meaning and intent of the present invention.

Figure 2:
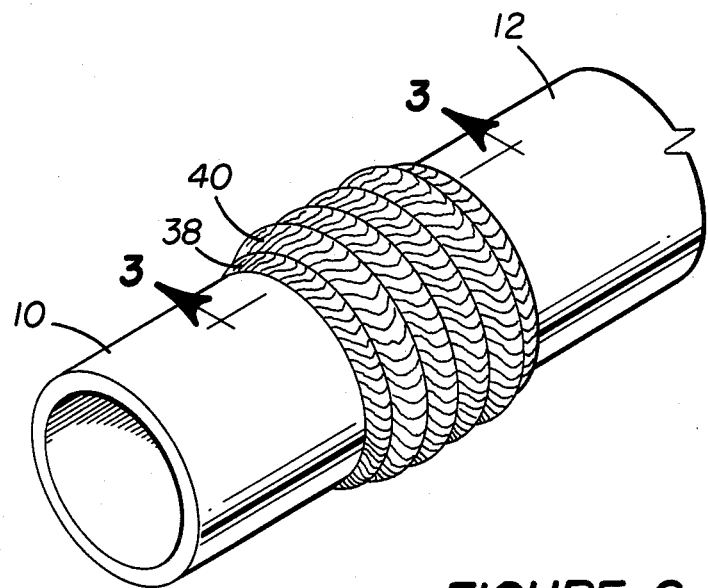
FIG. 2 depicts an overlay weld applied in accordance with the present invention.
Figure 3:
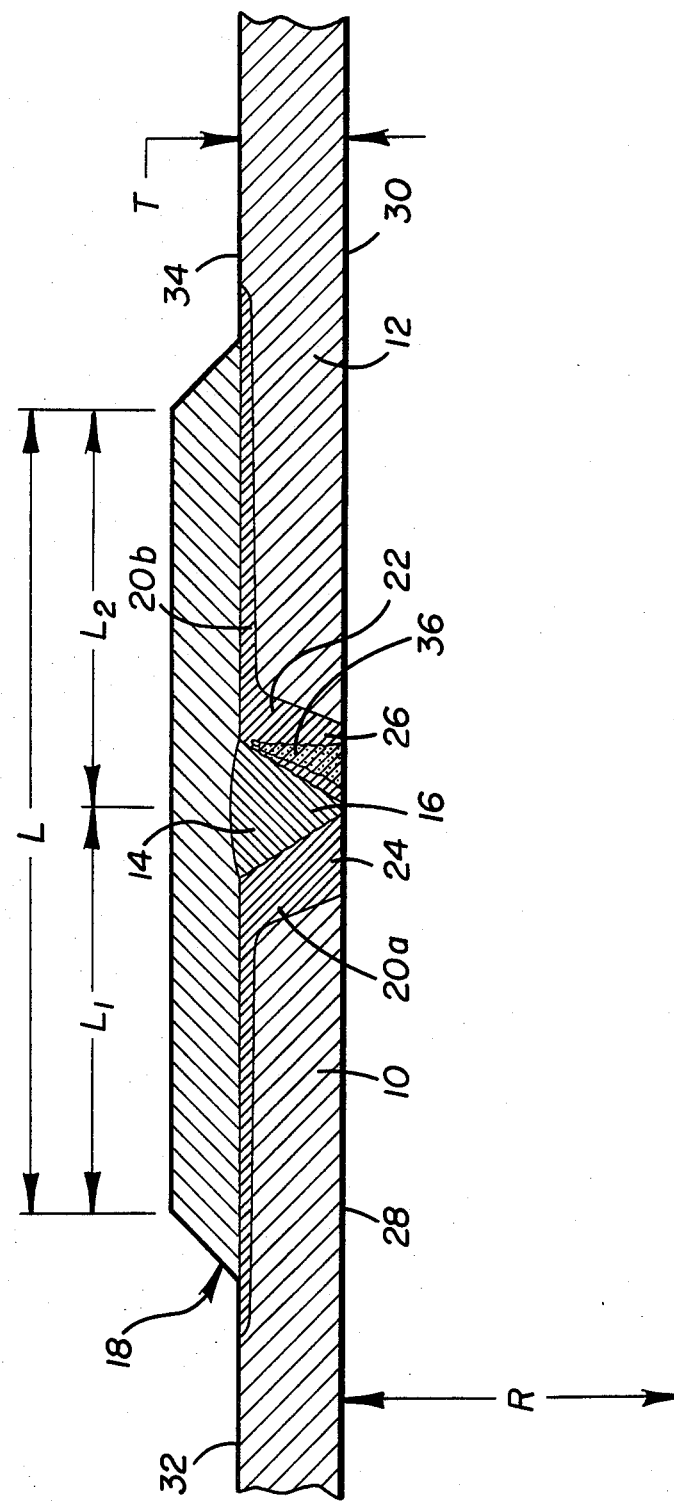
FIG. 3 depicts a cross-sectional view taken through line 3—3 in FIG. 2.

FIG. 3 is a cross-section through line 3—3 in line FIG. 2. FIG. 3 depicts the pipe sections 10 and 12 joined by primary weld 16. The overlay weld 18 is applied over the joint 14 and extends as will be described hereinbelow on either side of the joint 14. In addition, on either side of the primary weld 16 are heat effected zones or sensitized zones 20(a). Each of these zones has a first portion 24, 26 which contacts the inner diameters 28, 30 of the pipe sections 10, 12 respectively, on either side of the primary weld 16. These zones extend along adjacent the primary weld 16 and then along and adjacent the overlay weld 18 radially outwardly from the primary weld 16. The heat affected zones 20, 22 communicate with the outer diameters of the pipe sections 10, 12 outwardly of the overlay weld 18. It is well known that the heat affected zone is created during the welding process and follows the weld. It is to be understood that in the heat affected or sensitized zone carbides tend to precipitate at the grain boundaries, which precipitation makes the grain boundaries in the zones susceptible to corrosion cracking. Corrosion cracking is first caused on the inner diameter of the pipe sections in the first heat affected zone portions 24, 26 which are in contact with the process fluid which is carried through such pipes of a boiling water reactor. Such pure and boiling water can be vary corrosive to such stainless steel pipes. In FIG. 3 a crack 36 is shown. Crack 36 was initiated at the inner diameter 30 of pipe section 12 and propagated itself almost to the outer diameter of the pipe.

The overlay weld 18 is applied to control and prevent this stress corrosion cracking. The overlay weld can be applied initially before the pipe is put into service, or after the pipe has been placed in service and cracking has been indicated.

The overlay welding is applied by placing a circumferential and continuous weld bead 35 over the pipe joint. Then, additional weld bead 37 are applied circumferentially and continuously on either side of the initial bead and extends axially away from the initial weld bead as indicated in the figures. This process provides an initial layer of overlay weld 38 which produces its own heat affected zone 20(b). A second layer 40 of overlay weld 18 and subsequent layers may be applied on top of the initial layer. When these layers are applied, it is desirable that a liquid be passed through the pipe so that the sensitization zone on the outer diameter of the pipe 20(b) remains very shallow, so there is no additional sensitization of the inner diameter of the pipe.

A circumferential weld bead produces a constrictive force on the underlying pipe due to weld metal shrinkage. The accumulated effect of the weld beads comprising the overlay will be to produce compressive residual stresses under the overlay weld. These compressive residual stresses will cancel out the residual tensile stresses in the area of the pipe joint while making the area less susceptible to and controlling stress corrosion cracking. As the overlay weld will extend well beyond the area of the crack, propagation of the crack will be mitigated by the change residual stress pattern surrounding the crack.

The overlay weld could produce residual tensile stresses at the inner diameter of the existing pipe near the ends of the overlay. Stress corrosion cracking is unlikely to occur in these regions as significant sensitization does not occur at the inside diameter due to application of the initial overlay passes at low heat input, and rapid cooling provided by the water inside the pipe.

In a preferred embodiment, the dimensions of the overlay weld 18 can be determined as follows. In this embodiment the length, L, of the weld should be approximately 2 times the square root of the product of the radius, R, of the pipe and the thickness, T, of the pipe to ensure that the residual tensile stresses near the ends of the overlay are sufficiently attenuated so that they do not negate the compressive residual stress pattern produced by the overlay. In FIG. 3, "R" and "T" represent radius and thickness respectively. Accordingly, $L_1$ and $L_2$, which represent the length of the overlay weld from the center of the joint 14 outwardly to either end, or one half of L, should be approximately the square root of the product of the radius and the thickness. This relation was arrived at based on the known stress distribution which is present in a pipe which is subjected to point ring loading. At a point, which is approximately the distance of the square root of the product of the radius and the thickness, from the point of ring loading, the stress pattern is substantially attenuated. In a further refinement on this formulation, the lengths $L_1$ and $L_2$ can be increased by a length which is approximately the length of the crack as it exists and can be observed or estimated along the inner diameter of the pipe. The thickness of the weld in the preferred embodiment can be from one quarter of the thickness of the pipe to one full thickness of the pipe depending upon the nature of the indicated cracking and the external loads expected on the piping system.

Further objects, aspects and advantages of the invention can be obtained from a study of the drawings and the appended claims.

We claim:

1. A method for controlling and repairing a crack caused by stress corrosion cracking in a heat affected zone on the inner diameter of a welded pipe joint comprising the steps of applying to the outer diameter of the pipe an overlay weld including a plurality of circumferentially and continuously applied weld beads over the pipe joint with the crack and extending said overlay weld on each side of the pipe joint beyond the extremities of the heat affected zone on the inner diameter.

2. The method of claim 1 including the step of applying an initial weld bead over the pipe joint and then applying a second weld bead adjacent the initial weld bead and a third weld bead adjacent the second weld bead, extending axially from each side of the pipe joint.

3. The method of claim 1 including the step of simultaneously passing a liquid through the pipe.

4. The method of claim 1 including the step of applying at least one additional subsequent circumferential and continuous overlay weld on top of the first applied overlay weld.

5. A method for controlling and repairing a crack caused by stress corrosion cracking in the heat affected zone on the inner diameter of a welded pipe joint which is in service as part of a nuclear reactor comprising the steps of applying to the outer diameter of the pipe an overlay weld including a plurality of circumferentially and continuously applied weld beads over the pipe with the crack and extending said overlay weld on either side of the pipe joint for a predetermined distance which is about the square root of the product of the radius of the pipe and the thickness of the pipe.

6. A method for controlling and repairing a crack caused by stress corrosion cracking in the heat affected zone on the inner diameter of a welded pipe joint comprising the steps of applying a plurality of continuous weld beads transverse to the longitudinal axis of the pipe over the pipe joint with the crack and extending said overlay weld on each side of the pipe joint beyond the extremities of the heat affected zone on the inner diameter to create a compressive stress effect about the pipe joint.

7. A method for controlling and repairing a crack caused by stress corrosion cracking in a heat affected zone on the inner diameter of a welded pipe joint comprising the steps of:
applying to the outer diameter of the pipe an overlay weld including a plurality of circumferentially and continuously applied weld beads over the pipe joint with the crack; and
extending said overlay weld axially on each side of the pipe joint beyond the extremities of the heat affected zone on the inner diameter for a predetermined distance which is about the square root of the product of the radius of the pipe and the thickness of the pipe.

8. A method for controlling and repairing a crack caused by stress corrosion cracking in a heat affected zone on the inner diameter of a welded pipe joint comprising the steps of:
applying to the outer diameter of the pipe an overlay weld including a plurality of circumferentially and continuously applied weld beads over the pipe joint with the crack;
calculating the length of a crack; and
extending said overlay weld axially on each side of the pipe joint beyond the extremities of the heat affected zone on the inner diameter for a distance of the length of the crack plus a predetermined distance which is about the square root of the product of the radius of the pipe and the thickness of the pipe.

* * * * *